United States Patent [19]

Klowak

[11] Patent Number: 4,834,838

[45] Date of Patent: May 30, 1989

[54] FIBROUS TAPE BASE MATERIAL

[75] Inventor: Bernard G. Klowak, Neenah, Wis.

[73] Assignee: James River Corporation, Richmond, Va.

[21] Appl. No.: 17,220

[22] Filed: Feb. 20, 1987

[51] Int. Cl.⁴ .............................................. D21H 5/02
[52] U.S. Cl. .................... 162/109; 162/111; 162/113; 162/117; 162/204; 162/280; 162/281; 162/289; 162/306; 162/361; 162/362; 162/363
[58] Field of Search ............... 162/109, 113, 197, 204, 162/205, 305, 306, 361, 280, 287, 117, 362, 281, 111, 363

[56] References Cited

U.S. PATENT DOCUMENTS

| Re. 28,459 | 7/1975 | Cole et al. ................................. 34/6 |
| 790,023 | 5/1905 | Arkell . |
| 1,548,790 | 8/1925 | Lorenz . |
| 2,624,245 | 1/1953 | Cluett ......................................... 92/68 |
| 3,290,209 | 12/1966 | Ihrman ..................................... 162/361 |
| 3,301,746 | 1/1967 | Sanford et al. ......................... 162/113 |
| 3,537,954 | 11/1970 | Justus ..................................... 162/305 |
| 3,595,745 | 7/1971 | Cronin ................................... 162/306 |
| 3,598,697 | 8/1971 | McKie et al. .......................... 162/306 |
| 3,806,407 | 4/1974 | Bruinsma .............................. 162/306 |
| 3,821,068 | 6/1974 | Shaw ...................................... 162/111 |
| 3,974,025 | 8/1976 | Ayers ..................................... 162/113 |
| 3,994,771 | 11/1976 | Morgan, Jr. et al. ................. 162/113 |
| 4,072,557 | 2/1978 | Schiel .................................... 162/111 |
| 4,208,459 | 6/1980 | Becker et al. ......................... 428/154 |
| 4,309,246 | 1/1982 | Hulit et al. ............................ 162/113 |
| 4,420,372 | 12/1983 | Hostetler ............................... 162/280 |
| 4,440,597 | 4/1984 | Wells et al. ........................... 162/111 |
| 4,469,735 | 9/1984 | Trokhan ................................ 428/154 |
| 4,513,051 | 4/1985 | Lavash .................................. 428/212 |
| 4,528,239 | 7/1985 | Trokhan ................................ 428/247 |
| 4,551,199 | 11/1985 | Weldon ................................. 162/109 |
| 4,637,859 | 1/1987 | Trokhan ................................ 162/109 |

FOREIGN PATENT DOCUMENTS 1212473 11/1970 United Kingdom .

Primary Examiner—Peter Chin
Attorney, Agent, or Firm—Finnegan, Henderson, Farabow, Garrett & Dunner

[57] ABSTRACT

A sheet of fibrous web material having opposite smooth surfaces, an apparent bulk in the range of about 0.10 to about 0.20 caliper pts/lb ream and a machine direction stretch of at least 8%, wherein surface undulations on the opposite smooth surfaces of the sheet have an amplitude variance of less than 0.0002 inch. The invention includes an apparatus and a method of manufacturing the product comprising partially dewatering a wet fibrous web to about 30% to 50% solids, conveying the web to a compression nip defined by a smooth-surfaced roll and a smooth-surfaced fabric material, moving the fabric material at a speed of about 10% to 20% less than the surface speed of the smooth-surfaced roll, compressing the web in the nip with a compression force of less than 15 lbs/linear inch, with an average pressure of less than about 50 psi in the compression nip, and drying the web. The dried web has an apparent bulk less than 0.20 caliper pts/lb ream.

26 Claims, 9 Drawing Sheets

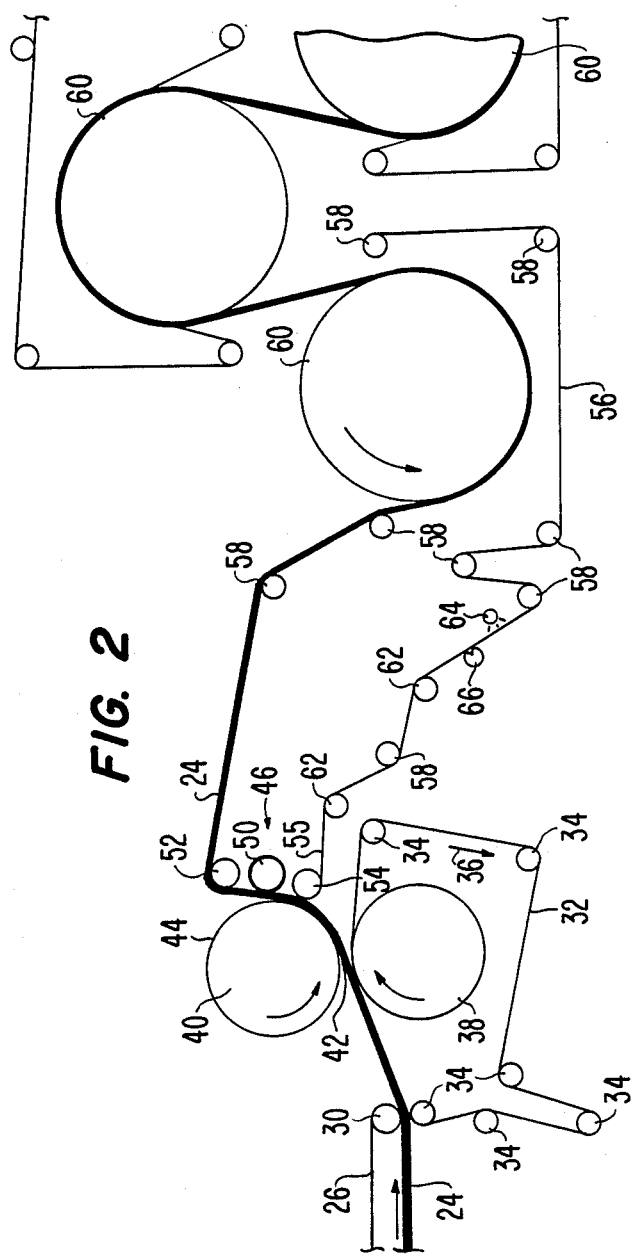

Mesh

Diam. mm. warp .17, shute

Weave: 5-shed (1X4) broken twill

Surface shown contacts web

Magnification 11.0 X

65

FIBROUS TAPE BASE MATERIAL

BACKGROUND OF THE INVENTION

1. Field of the Invention

This invention relates to a fibrous sheet material having improved surface smoothness and improved stretch characteristics and a method and apparatus for manufacturing it.

2. Description of the Related Art

Fibrous sheet base materials are conventionally used in tapes such as masking tape. In such tapes, and adhesive is applied to one side of the sheet of fibrous base material while a nonstick coating is applied to the opposite side. The coated sheet is then wound and cut in rolls.

In many applications, it is important that the tape be stretchable. For example, when masking tape is used to mask portions of an automobile being painted, the tape must be capable of stretching so that the tape may be smoothly applied along curved or irregular edges.

It is also important that such tapes have relatively smooth surfaces so as to minimize the amounts of adhesive and nonstick coating required to cover the tape, and to provide improved tape performance. For example, when tape is used for masking during painting operations, it is desirable that the side of the tape adhering to the object being painted be as smooth as possible in order to prevent paint seepage beneath the edge of the tape. Making the opposite nonstick surface smooth faciliates prolonged use of the tape because a smooth outer surface will not irritate the fingers and thumbs of workmen applying the tape for prolonged periods, thus helping prevent the "sore thumb" problem experienced by many car painters.

Stretchability in tapes has been conventionally achieved by creping the tape base material while it is still in a wet state as it is being produced on a paper machine. Conventional creping of masking tapes is described in U.S. Pat. No. 2,941,661 issued to Picard et al. In such creped tapes, creping is performed on a wet press roll with a thin and sharp creping blade so as to impart about 40 to 60 crepe lines per linear inch and to provide rounded crepe ridges on one side and a flat appearing reverse side. This creped structure is retained during subsequent drying of the tape base. However, this creping process is difficult to control and presents many problems in maintaining product uniformity and productivity. Additionally, a creped sheet by its very nature is not smooth and the best that can be hoped for is to make the crepes as fine, uniform and even as possible.

Improvement in stretch of paper webs has been achieved with the apparatus and process for treating web material disclosed in U.S. Pat. No. 4,551,199 issued to Weldon. According to Weldon, bulking and creping of a paper web is achieved by transporting a web into a differential velocity nip defined by a web support surface and an open mesh fabric pick-up member having voids therein. The pick-up member has a relative velocity slower than that of the support surface at the nip location. When the web is applied to the fabric pick-up member, the web is impressed into the voids of the fabric so as to emboss the web. Also, as the web approaches the nip, a deceleration of the web occurs due to the slower moving fabric filaments of the pick-up member causing the web to collapse on itself one or more times to form crepe folds. The succeeding folds in the web press against earlier folds, pushing them into the voids of the fabric. The size and number of folds are determined by the flexibility of the web and the magnitude of the relative velocity differential between the pick-up fabric and the transport member support surface.

Web material produced as described in Weldon has surface undulations and a caliper greater than is desirable for tape base materials. For fiber web sheets of a given thickness, as the amplitude of surface undulations decreases, the density of the sheet increases. Accordingly, apparent bulk, which is the inverse of sheet density, decreases as the amplitude of the undulation decreases. For a tape base material, it is advantageous for the caliper of the tape base material to be relatively thin, that is less than 0.008". Sheets of this thickness produced according the process disclosed in Weldon have an apparent bulk greater than 0.4 cal pts/lb ream which is indicative of folding and bulking much greater than what is desirable for tape base materials.

SUMMARY OF THE INVENTION

Accordingly, it is an object of the present invention to improve upon known apparatus and methods of manufacturing fibrous web products to produce a tape base material having significantly improved smoothness, which results in a lower apparent bulk, while at the same time maintaining the desired stretch characteristics and thin caliper that are important for tape base materials.

Additional objects and advantages of the invention may be realized and obtained by means of the instrumentalities and combinations particularly pointed out in the appended claims.

The method of the invention for manufacturing a stretchable fiborous tape base material having surfaces with improved smoothness comprises the steps of forming a wet fiborous base, partially dewatering the web to between about 30% and 50% solids, conveying the partially dewatered web on a smooth-surfaced roll to a compression nip defined by the smooth-surfaced roll and a smooth-surfaced fabric material, moving the fabric material at a smooth-surfaced fabric material, moving the fabric material at a speed of about 10% to about 20% less than the surface speed of the smooth-surfaced roll, compressing the web in the nip by forcing the fabric material against the web on the smooth-surfaced roll to directly transfer the web from the roll to the material, the fabric material being compressed against the web with a compression force of less than 15 lbs/linear inch or an average pressure of less than about 50 psi in the compression nip, the web being also compressed in the machine direction by the difference in speed between the fabric material and the surface of the roll, and drying the web, the dried web having an apparent bulk less than 0.20 caliper pts/lb ream of 3000 sq. ft. Preferably, the dried web has a caliper of less than 0.006 inch.

The method may further include the step of passing the dried web through a one nip claendar with a nip pressure in the range of 40 to 60 lbs/linear inch. In the method of the preferred embodiment, the fabric material has a first surface facing the smooth-surfaced roll, the first surface being shaved to reduce roughness. It is preferred that the fabric be a 5-shed (1×4) broken twill weave with an 84×84 per square inch mesh.

In another preferred embodiment of the invention, the compression nip may be otherwise embodied as a non-compression nip between the roll and a fluid-pervious material having an undulating, patterned surface. In this embodiment of the invention, a vacumm may be applied through the material at the nip to directly transfer the web from the roll to the material and to generally conform the surface of the web in contact with the moving material to the pattern surface of the material while the surface of the web opposite the moving material remains substantially smooth.

The apparatus of the invention comprises means for forming a wet fibrous web, dewatering means for partially dewatering the web to between about 30% and about 50% solids, a smooth-surfaced roll having an outer circumferential surface for conveying the dewatered web at a predetermined speed to a transfer station, a sheet of fabric material for receiving the web at the web transfer station and for conveying the web from the transfer station at a speed less than the predetermined speed, the sheet of fabric material being substantially tangential to a point on the outer circumferential surface of the smooth-surfaced roll at the transfer station, compression means acting with a compression force of less than 5.5 lbs/linear inch on the web through the sheet of fabric material for transferring the web from the smooth-surfaced roll to the sheet of fabric material, and for compressing the web to adjust the apparent bulk of the web, and means for drying the web after compression, the dried web having an apparent bulk of less than 0.20 caliper pts/lbs ream.

The apparatus may further comprise a one nip calendar for receiving the web from the drying means, the one nip calendar having a nip pressure in the range of 40 to 60 lbs/linear inch. Preferably, the dewatering means comprises felt-loop means for receiving the wet web from the forming means and the generally smooth-surfaced roll defines a first compression nip with the felt-loop means. In the preferred embodiment, the smooth-surfaced roll defines a second compression nip with the sheet of fabric material at the web transfer station. The fabric may be a 5-shed (1×4) broken twill weave with an 84×84 per square inch mesh.

It is preferred that the compression means comprise a back-up roller covered with a soft elastic material, the back-up roller abutting a second surface of the sheet of fabric material opposite from the first surface at the second compression nip. The preferred embodiment may further comprise back-up roller adjusting means for moving the back-up roller toward and away from the smooth-surfaced roll to adjust the compression of the fabric material against the web and smooth-surfaced roll, the first surface of the sheet of fabric material being tangential to the surface of the smooth-surfaced roll at the second compression nip when the back-up roller is adjusted away from the smooth-surfaced roll. The fabric material may be supported between first and second support rollers on opposite sides of the transfer station, the first and second support roller aligned to support the fabric material at a tangent to the outer circumferential surface of the smooth-surfaced roll at the second compression nip.

In another preferred embodiment of the invention, the apparatus may comprise means for forming a wet fibrous web, dewatering means for partially dewatering the web to betweeen about 30% and about 50% solids, smooth-surfaced means for conveying the dewatered web at a predetermined speed to an embossing station, fabric conveying means for supporting the web at the embossing station and for conveying the web from the embossing station at a speed less than the predetermined speed, embossing means acting on the web through the fabric conveying means at the embossing station, for forming a three dimensional surface on one face of the web, and means for drying the web after embossing.

The product of the invention is a sheet of fibrous web material comprising contacting fibers bonded together, the sheet having opposite smooth surfaces, an apparent bulk in the range of about 0.10 to about 0.20 caliper pts/lb ream and a machine direction stretch of at least 8%, and wherein surface undulations on the opposite smooth surfaces of the sheets have an amplitude variance of less than 0.0002 inch. It is preferred that the sheet has a machine direction tensile strength of at least 16 lbs/inch and that the sheet have a caliper of less than 0.006 inch.

More particularly, the product of the invention may be in a masking tape comprising a sheet of fibrous material having first and second surfaces, the first surface having an adhesive coating and the second surface having a nonstick coating, the improvement comprising a fibrous sheet having an apparent bulk in the range of about 0.10 to about 0.20 caliper pts/lb ream and a machine direction stretch of at least 8%, and wherein surface undulations on the first and second surfaces of the sheet have an amplitude variance of less than 0.0002 inch.

In another preferred embodiment of the invention the fibrous tape base web material comprises contacting fibers bonded together, the web having a first surface with patterned undulations and an opposite second relatively smooth surface, the web sheet having an apparent bulk in the range of about 0.10 to about 0.20 caliper pts/lb ream, a machine direction tensile strength of at least 16 lbs/inch and a machine direction tensile strength of at least 8%.

BRIEF DESCRIPTION OF THE DRAWINGS

The accompanying drawings which are incorporated in and constitute a part of this specification, illustrate the embodiments of the invention, and together with the description, serve to explain the principles of the invention.

FIG. 2 is a schematic side elevation view of one embodiment of the apparatus of the invention used for forming the fibrous web of the invention.

DETAILED DESCRIPTION OF THE PREFERRED EMBODIMENTS

Reference will now be made in detail to the present preferred embodiments of the invention, examples of which are illustrated in the accompanying drawings.

The Apparatus

Figure 1:
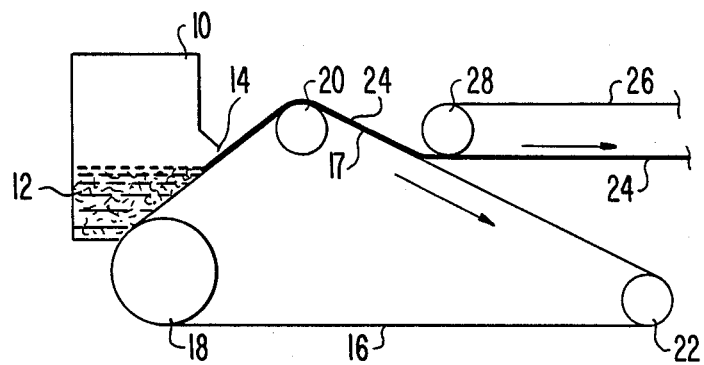
FIG. 1 is a schematic side elevation view of a portion of an apparatus of the invention used for forming a wet fibrous web.

The apparatus of the invention for manufacturing a stretchable fibrous base web having opposite surfaces with improved surface smoothness and reduced apparent bulk comprises means for forming a wet fibrous web. As depicted schematically in FIG. 1, the forming means includes a head box 10 for containing a supply of fiber furnish 12 which generally comprises a dilute slurry of fiber and water. Head box 10 includes slice 14 disposed over the moving surface of a condenser 16, which in this embodiment is a foraminous woven wire such as a Fourdrinier wire. The fiber furnish in head box 10 issues from slice 14 onto the upper surface or flight 17 of wire 16. Wire 16 moves in a continuous loop around breast roll 18 and wire turning rolls 20 and 22. One or more rolls including rolls 18, 20 and 22, are driven to move wire 16 around its loop. Additional guide rolls (not shown) may be used to support and/or drive wire 16.

Water is removed from the furnish disposed on wire 16 forming a wet web 24. One or more vacuum boxes, deflectors and hydro-foils (not shown) may be employed along upper flight 17 of wire 16 to assist in removal of water from web 24 during its formation.

Wet web 24, proximate the end of upper flight 17 of wire 16, is transferred to pick-up felt 26 which is lightly pressed into engagement with web 24 on wire 16 by means of upper couch roll 28. Transfer of web 24 to felt 26 may be accomplished or assisted by other means such as an air knife or vacuum box (not shown), both means being well known.

Felt 26 moves in the same direction as wire 16 in a continuous path around upper couch roll 28 and press roll 30. One or more guide rolls (not shown) may also be used to support felt 26. At least one roll supporting felt 26 is driven to move felt 26 at a speed preferably substantially the same as wire 16. A guide board and showers (not shown) may be employed adjacent the surface of felt 26 to clean and condition the felt prior to pick up of web 24 as is well known.

In accordance with the apparatus of the invention, the apparatus includes dewatering means for partially dewatering the web to between about 30% and about 50% solids. As embodied and depicted in FIG. 2, the dewatering means includes felt loop 32 for receiving the wet web 24 from felt 26. Felt loop 32 is supported on a plurality of turning rolls 34 so as to rotate the felt in the direction indicated by arrow 36. Felt 32 passes through a first compression nip formed between press roll 38 and smooth-surfaced transfer roll 40. Web 24 passes through a nip 42 formed between press roll 38 and transfer roll 40. In nip 42, web 24 is compressed between the felt on press roll 38 and smooth-surfaced transfer roll 40 so as to dewater web 24 to between 30% and 50% solids. Preferably, web 24 is dewatered to about 40% solids. Moisture removed from web 24 at nip 42 is transferred by felt loop 32 and is removed from the felt by a ringer (not shown) or other well known conventional means.

In accordance with the apparatus of the invention, the apparatus includes a smooth-surfaced roll having an outer circumferential surface for conveying the dewatered web at a predetermined speed to a transfer station. Preferably, smooth-surfaced roll 40 has an outer circumferential surface 44 for transporting dewatered web 24 to transfer station 46, as depicted in FIG. 2. Smooth-surfaced transfer roll 40 is driven at a fixed predetermined speed.

Figure 3:
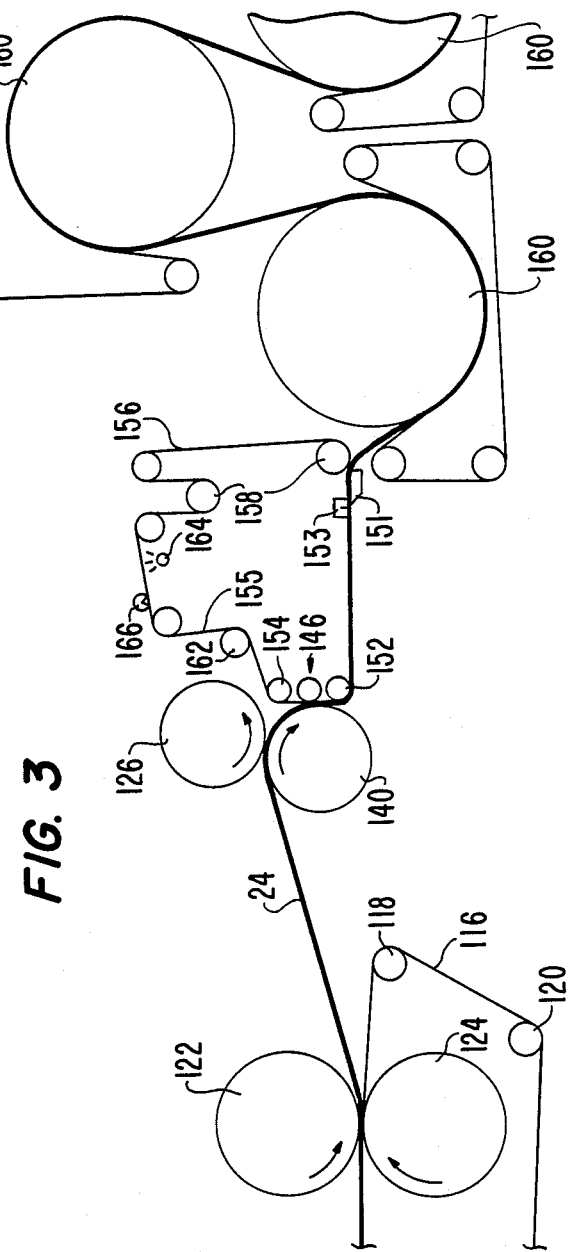
FIG. 3 is a schematic side elevation view of another embodiment of the apparatus of the invention used for forming the fibrous web of the invention.

The dewatering means may be otherwise embodied as shown in FIG. 3. In this embodiment web 24 is transferred on a felt or wire loop 116 from a web forming tank similar to head box 10 of FIG. 1. Rolls 122 and 124 press the web to dewater it to between 30% and 50% solids. Dewatered web 24 then is drawn between a rubber roll 126 and a smooth-surfaced roll 140 whereby web 24 conforms to the surface of roll 140 to be conveyed by rotation to transfer station 146.

In accordance with the apparatus of the invention, the apparatus includes a sheet of fabric material for receiving the web at the web transfer station and for conveying the web from the transfer station at a speed less than the predetermined speed, the sheet of the fabric material being subtantially tangential to a point on the outer circumferential surface of the smooth-surfaced roll at the transfer station. As embodied herein, a sheet of fabric material 55 is part of a continuous fabric loop 56 mounted on support rollers 52 and 54 on opposite sides of transfer station 46 and on a plurality of guide rolls 62 and a dryer 60. Stretch rollers 58 may be employed to maintain the desired tension in fabric loop 56. Showers 64 may be employed to clean fabric 55 of fabric loop 56 upon each rotation of the loop and vacumm 66 may be employed for removing excess shower fluid from fabric 55.

In the embodiment of the invention shown in FIG. 3, fabric material 155 is part of a fabric loop 156 mounted on turning rollers 152 and 154 on opposite sides of transfer station 146 and on guide rollers 162. A stretch roller 158 may be employed to maintain a desired tension in fabric loop 156.

Figure 6:
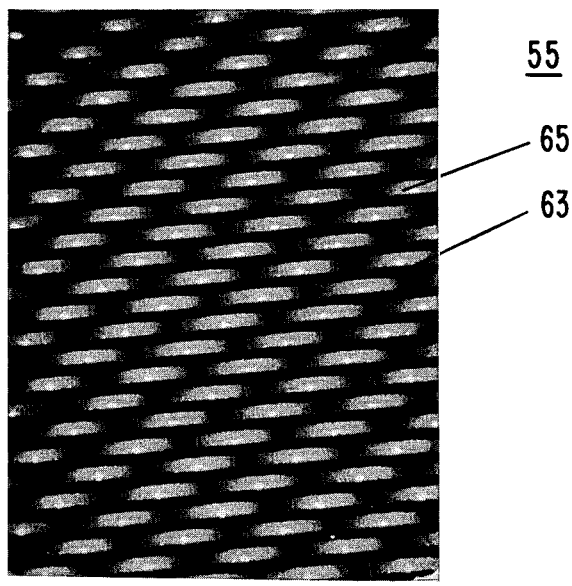
FIG. 6 is a photo-microtome of the fabric material used in the embodiments of the invention shown in FIGS. 4 and 5.
Figure 7:
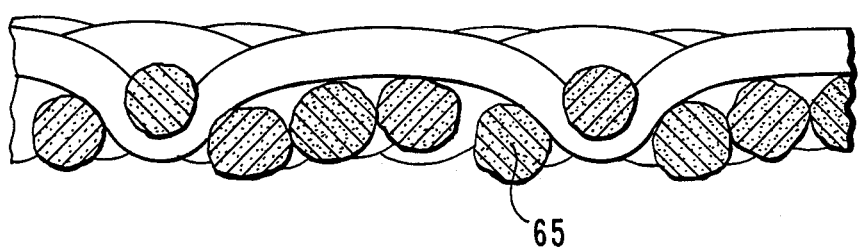
FIG. 7 is a cross section of the fabric material shown in FIG. 6.

According to a preferred embodiment of the apparatus the invention the sheet of fabric material has a first smooth and porous surface facing the smooth-surfaced roll at the transfer station. Preferably, the fabric material is comprised of a 5-shed (1×4) broken twill weave with an 84×84 per square inch mesh of polyester threads 65 having a diameter less than 0.007 inch wherein each of the threads is spaced within 0.006 of a generally parallel thread. A photo-microtome of the fabric material described above is shown in FIG. 6. FIG. 7 shows a cross section of the fabric shown in FIG. 6.

In a preferred embodiment of the apparatus of the invention, the fabric material moves at a speed of about 10% to about 20% less than the surface speed of the smooth-surfaced roll. The fabric material is subjected to a machine direction tension in which the tension in the fabric entering the transfer station is greater than the tension in the fabric leaving the transfer station. Preferably the speed differential between the fabric and the surface of the smooth surfaced roll is about 14% to 16% where $$\text{Speed Differential} = \frac{\text{Velocity (roll)} - \text{Velocity (fabric)}}{\text{Velocity (roll)}} \times 100\%$$

Figure 4:
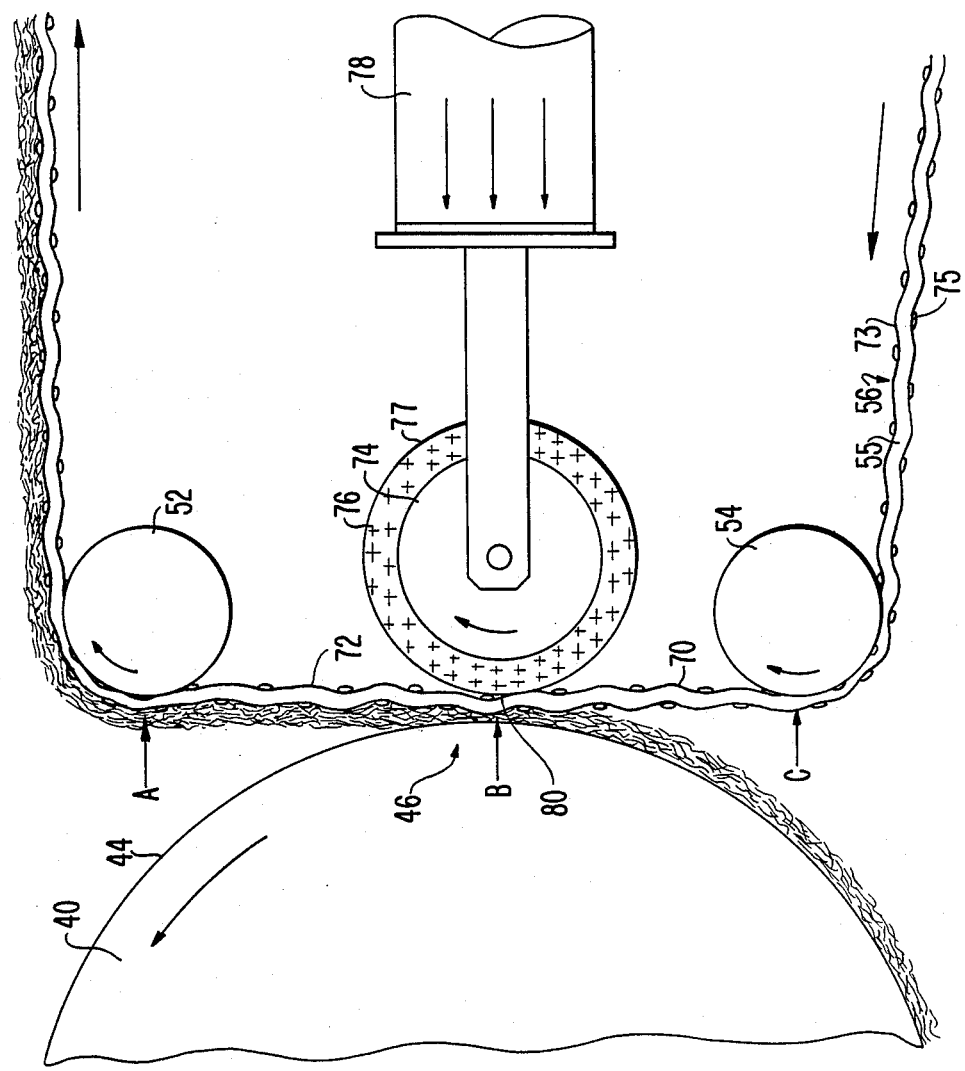
FIG. 4 is an enlarged view of the transfer station portion of the embodiment shown in FIG. 2.

Because fabric loop 56 moves at a slower speed than surface 44 of smooth-surfaced roll 40, tension in the portion of the fabric loop 70 between the turning roller 54 and transfer station 46, as shown in FIG. 4, will be greater than tension in the portion of the fabric loop 72 between turning roller 52 and transfer station 46. Depending on the elasticity of fabric 55 in fabric loop 56, fabric 55 undergoes delongation as it passes through transfer station 46 because of the differential tensions. Specifically, the length of voids 63 in fabric 55 are shortened in the machine direction as fabric 55 passes through transfer station 46. Such delongation has a "pinching" effect on web 24 as the web exits from transfer station 46. This pinching may contribute to the unique stretch characteristics of the finished web material while also helping fabric 55 of fabric loop 56 to firmly hold web 24 as it exits from the transfer station.

Figure 5:
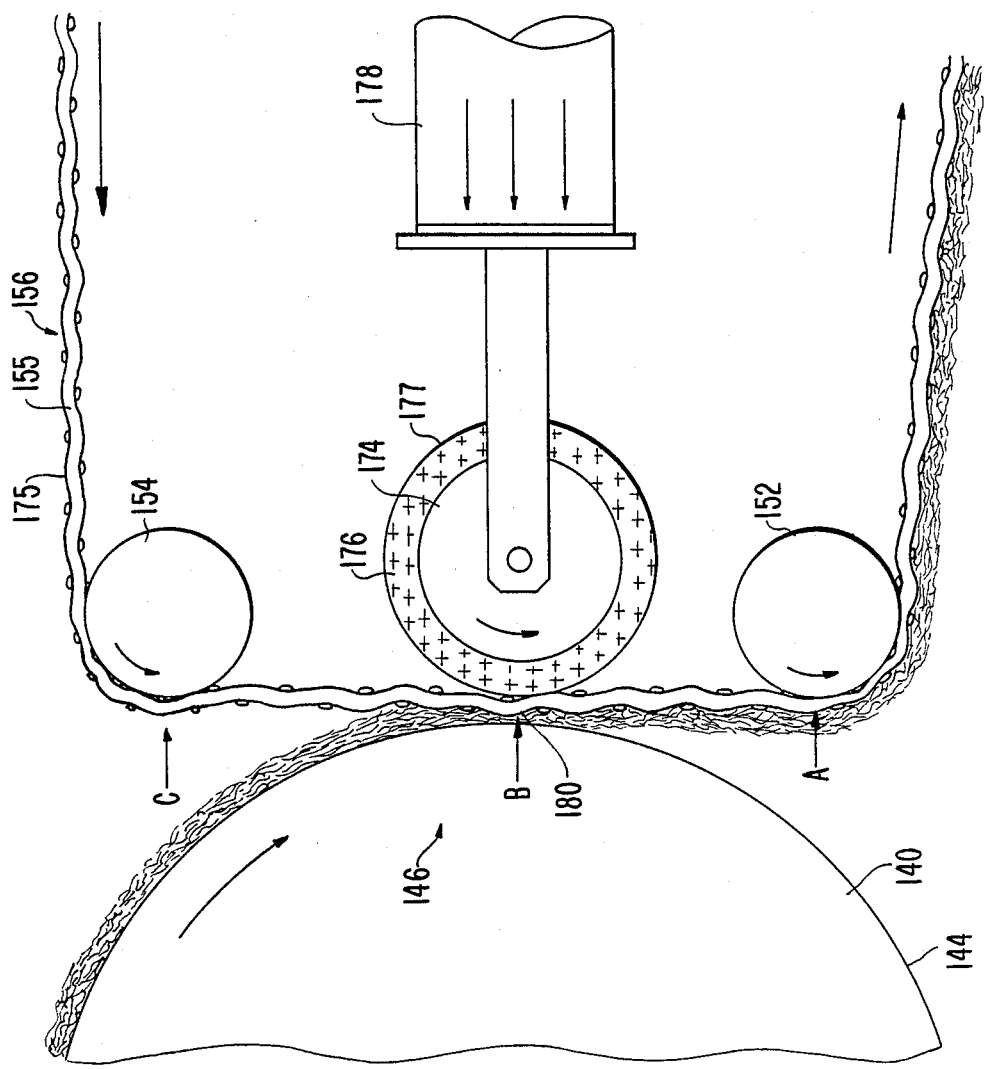
FIG. 5 is an enlarged view of the transfer station portion of the embodiment shown in FIG. 3.

In accordance with the invention, the apparatus includes compression means acting with a compression force of less than 15 lbs/linear inch with an average pressure of less than 50 psi in the compression nip on the web through the sheet of fabric material for transferring the web from the smooth-surfaced roll to the sheet of fabric material. An enlarged view of the transfer station portion of the apparatus of FIG. 2 is shown in FIG. 4 and a similar enlarged view of the transfer station portion of the apparatus of FIG. 3 is shown in FIG. 5. Because the apparatus shown in FIG. 5 is very similar to the apparatus shown in FIG. 4, except that the two apparatuses operate in opposite directions, FIGS. 4 and 5 will be described together. Preferably, the compression means comprises a back-up roller 74, 174 covered with a soft elastic material 76, 176. Back-up roller 76, 176 abuts a second surface 73, 173 of the sheet of fabric material opposite from the first surface 75, 175 and a second compression nip defined by surface 44, 144 of smooth-surfaced roll 40, 140 and first surface 75, 175 of fabric material 55, 155.

The compression means preferably includes back-up roller adjusting means for moving the back-up roller toward and away from the smooth-surfaced roll to adjust the compression of the fabric material against the web and smooth-surfaced roll. Preferably, the first surface of the fabric material is tangential to the surface of the smooth-surfaced roll at the second compression nip when the back-up roller is adjusted away from the smooth-surfaced roll. As embodied herein, the adjusting means comprises a powered cylinder 78, 178 for moving back-up roll 74, 174 toward or away from smooth-surfaced roll 40, 140. Turning rollers 52, 152 and 54, 154 support fabric 55, 155 on opposite sides of back-up roll 74, 174 so that the surfaces of back-up rolls 52, 152 and 54, 154 and surface 44, 144 of smooth-surfaced roll 40, 140 are aligned in a straight line at points A, B and C, as shown in FIGS. 4 and 5, to support fabric 55, 155 at a tangent to outer surface 44, 144 of smooth-surfaced roll 40, 140 at second compression nip 80, 180. Because points A, B and C are aligned, turning rolls 52, 152 and 54, 154 do not add to the compression force applied to smooth-surfaced roll 40. Similarly, because of the alignment of points A, B, and C, back-up roll 76, 176 does not have to overcome any tension or forces in the fabric 55, 155 acting against back-up roll 76, 176. Accordingly, back-up roll 76, 176 can be controlled to apply the desired compression force of less than 15 lbs/linear inch against the smooth-surfaced roll without having to overcome opposing forces in fabric 55, 155. Preferably, the fabric is pressed against the web with a compression force of less than 5 lbs/linear inch with an average pressure of less than 20 psi in the compression nip. Because the compression force can be so exactly controlled, a compression force can be applied to the web that is sufficent to cause the web to transfer from smooth-surfaced roll 40, 140 to fabric 55, 155 without causing web 24 to be embossed by fabric 56, 156.

According to preferred embodiments of the apparatus of the invention, the back-up roller has an outer circumferential surface pattern with raised cross hatching. As embodied herein the surface of the back-up roller is made of a soft rubber material so that it compresses easily and applies only a minimal pressure to the fabric and web so as to provide a nip with a maximum area of contact between the fabric and the fibrous web. It is preferred that the cover have a raised cross hatch pattern on it in which the area of the raised pattern is about 35% of the total area of outer circumferential surface 77, 177 of roller 76, 176. This cross hatch pattern makes the roller surface more readily compressible. However, a smooth surfaced roll of suitable softness can also be employed.

In accordance with the invention, the apparatus further includes means for drying the web after compression. Preferably the drying means results in a dried web having an apparent bulk of less than 0.20 caliper pts/lb ream of 3000 sq. ft. in area. As shown in FIGS. 2 and 3, drying means may comprise conventional dryers 60, 160 as are well known. In FIG. 2, fabric loop 56 is shown transporting the wet web to the first of the dryers 60, while in the embodiment of FIG. 3, the wet web is removed from fabric loop 56 by an air knife 153 and a sheet threader 151, as are well known, so that the web can be conveyed to the first of dryers 160.

Figure 8:
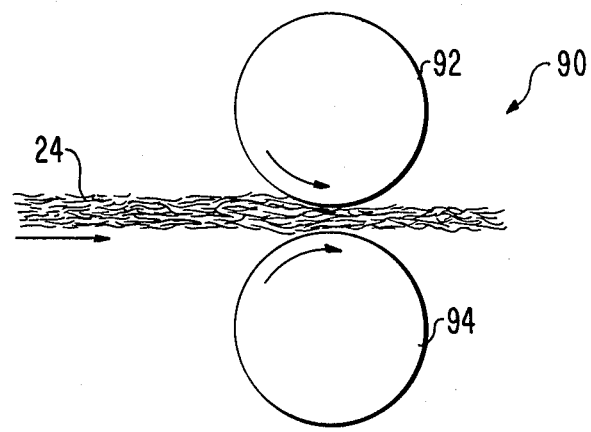
FIG. 8 is a schematic side elevation view of a portion of the apparatus of the invention for treating the dried fibrous web.

In accordance with a preferred embodiment of the apparatus of the invention, the apparatus may include a one nip calendar for receiving the web from the drying means, with the one nip calendar having a nip pressure in the range of 40 to 60 lbs/linear inch. As shown in FIG. 8 dried web 24 is passed through a light one nip calendar 90, having press rolls 92 and 94, to provide for smoothness and caliper uniformity. Preferably the calendar applies a nip pressure of about 50 lbs/linear inch.

Figure 9:
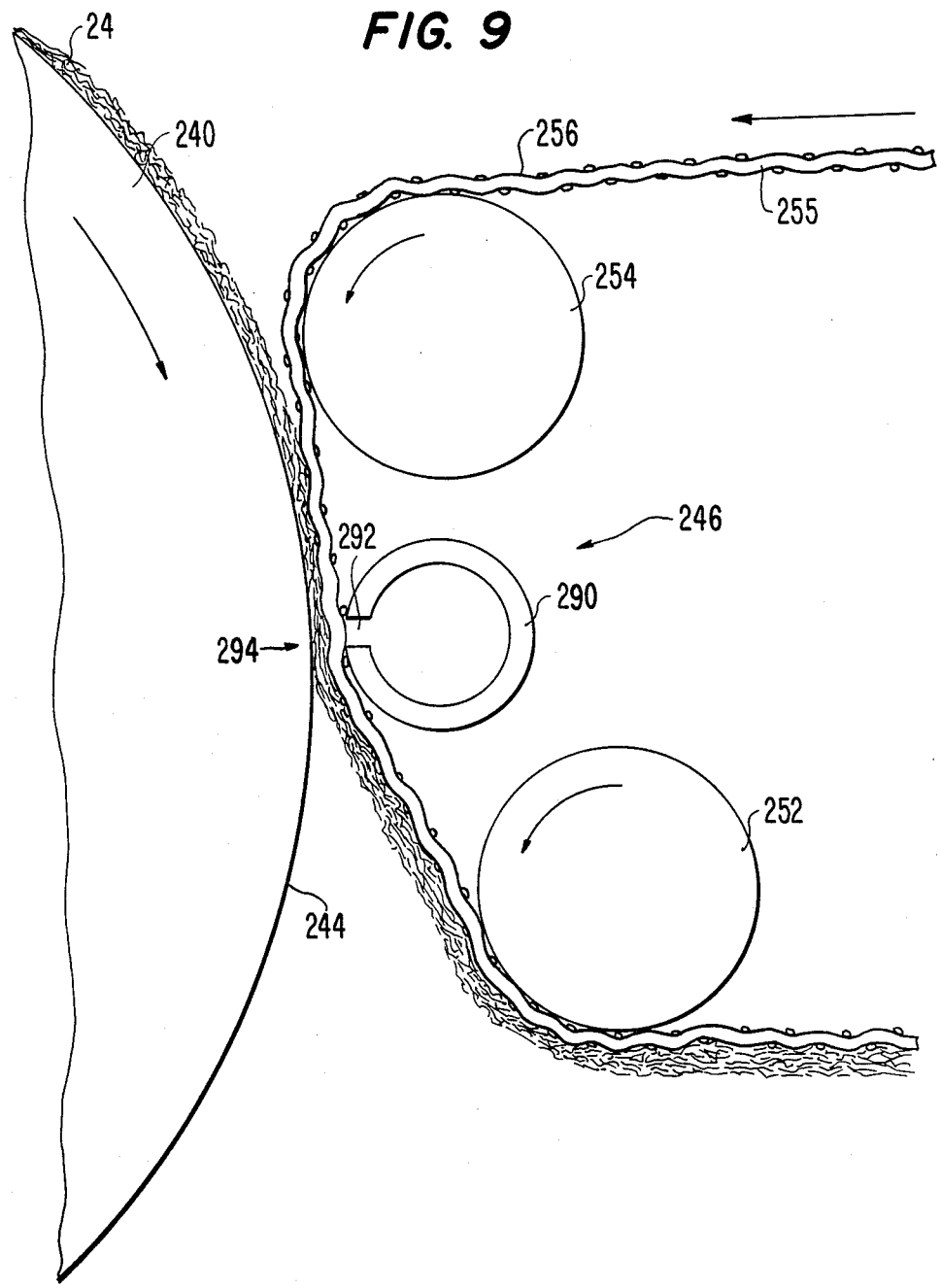
FIG. 9 is an enlarged schematic side elevational view of an embossing portion according to another embodiment of the invention that may replace the transfer station shown of FIGS. 4 and 5.
Figure 10:
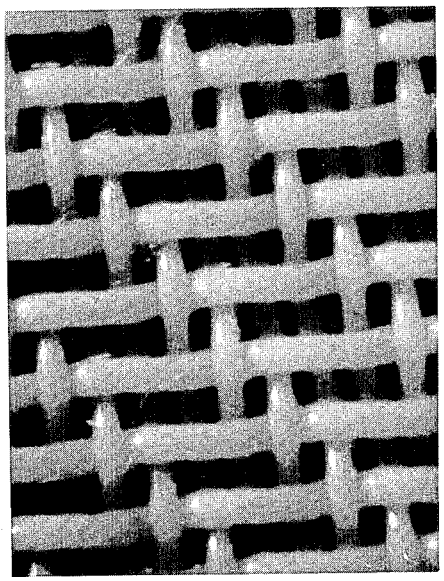
FIG. 10 is a photo-microtome of a cross section of the fabric material used in the embodiment of the invention shown in FIG. 8.

According to another embodiment of the invention, as shown in FIG. 9, the apparatus for manufacturing a stretchable fibrous web may include smooth-surfaced means for conveying the dewatered web at a predetermined speed to an embossing station, fabric conveying means for supporting the web at the embossing station and for conveying the web from the embossing station at a speed less than the predetermined speed, embossing means acting on the web through the fabric conveying means at the embossing station, for forming a three-dimensional surface on one face of the web. As embodied herein, an outer smooth-surface 244 of smooth-surfaced roll 240 conveys dewatered web 24 at a predetermined speed to an embossing station 246. Fabric 255 is arranged in a loop 256. Preferably, fabric 255 is fluid pervious and has a undulating patterned surface. One example of such a fabric is shown in FIG. 10.

Preferably, web 24 is transferred to fabric loop 256 at a non-compression nip 24 formed between surface 244 of roll 240 and vacuum roll 290. A vacuum slit 292 in vacuum roll 290 applies a vacuum through fabric 255 to web 24 so that undulations in fabric 255 emboss web 24. A vacuum between 1 and 18 inch Hg may be used. Although not shown as such in FIG. 9 the surfaces of rolls 252, 254 and smooth-surfaced roll 240 should preferably be aligned in a straight line in this embodiment similar to that in the former embodiments.

The Method

The method of the invention comprises a series of steps including the step of forming a wet fibrous web. Preferably, a dilute slurry of fiber and water is deposited on a flat, moving, foraminous surface, such as a felt or Fourdriner wire, to form a wet web of fibers which is subsequently transferred to another moving felt. The fibers are preferably lignocellulosic but may also be other known synthetic fibers.

In accordance with the method of the invention, the wet fibrous web is partially dewatered to between about 30% and about 50% solids. In the preferred embodiment, a lignocellulosic web is pressed in a nip defined by rotating rolls. Water removed from the web is retained by the felt on which the web is conveyed.

Other known methods may be used for forming a wet fibrous web and for partially dewatering the wet web to the required percentage of solids. Conventional wet compressing techniques are well known in the paper making industry. Partially dewatering the web enables the compression step to provide the desired final web characteristics and makes for more energy efficient drying of the prepared web material. However, it is important to note that the web remains 70–50% wet after dewatering. Over-drying of the web through pressing could substantially reduce the effectiveness of the subsequent manufacturing steps for producing a stretchable tape base material.

In accordance with the invention, the method includes conveying the partially dewatered web on a smooth-surfaced roll to a compression nip defined by the smooth-surfaced roll and a smooth-surfaced fabric material. The fabric material is moved at a speed about 10% to about 20% less than the surface speed of the smooth-surfaced roll. In the presently preferred embodiment, the speed differential is between about 14 and 16% where $$\text{Speed Differential} = \frac{\text{Velocity (roll)} - \text{Velocity (fabric)}}{\text{Velocity (roll)}} \times 100\%$$

The speed differential causes microcrimping within the web fibers without causing the exterior surfaces of the web to become rough or undulated. This microcrimping and microkinking of the fabric fibers contributes to the stretch characteristics of the finished web product.

In the embodiment of the invention shown in FIG. 2, the web is conveyed directly from felt 32 to smooth-surfaced roll 40 and then to fabric 56. Direct transfer of the web permits constant support of the web throughout the forming process. In the embodiment of the invention shown in FIG. 3, the web is self-supported between the dewatering rollers 122, 124 and smooth-surfaced roll 140.

In accordance with the invention, the method includes the step of compressing the web in the compression nip by forcing the fabric material against the web on the smooth-surfaced roll to directly transfer the web from the roll to the material, the fabric material being compressed against the web with a compression force of less than 15 lbs/linear inch, or an average pressure of less than about 50 psi in the compression nip, the web being further compressed by the difference in speed between the fabric material and the surface of the roll. The smooth-surfaced fabric material has a first surface facing the smooth-surfaced roll at the compression nip, that is preferably shaved to reduce roughness. Because the fabric material is comprised of fine woven polyester threads, and because the compression force is less than 15 lbs/linear inch, the surface of the web is not embossed in the compression nip. The applied compression force of 15 lbs/linear inch or average pressure of 50 psi in the compression nip is great enough to smooth the surfaces of the web and the compression nip and to cause the web to be transferred from the transfer roller to the fabric material, but not so great as to compress the web to an extent that might reduce stretchability in the finished web product. Further, only selected areas of the fabric material are forced against the web by the compression force in order to minimize the pressure of the fabric against the web so as to minimize fabric embedment into the web which in turn helps achieve a smoother web surface.

According to a preferred method of the invention, the fabric material is subjected to a tension on opposite sides of the compression nip, the tension of the fabric material entering the nip being greater than the tension of the fabric material exiting the nip. As embodied herein, the greater speed of the surface of the smooth-surfaced roll as compared to the fabric causes the tension in the fabric entering the nip to be greater than the tension in the fabric leaving the nip. Depending on the elasticity of the fabric, the length of the voids in the fabric are shortened in the machine direction as the fabric passes through the nip. This shortening has a "pinching" effect on the web which may contribute to the properties of the fibrous web product produced by this method. The "pinching" effect also helps the fabric to hold onto the web.

In accordance with the invention, the method further includes the step of drying the web, the dried web having an apparent bulk of less than 0.20 caliper pts/lb ream. Preferably, the web is dried with a Yankee dryer to which it is transferred and dried in a known manner.

According to a preferred embodiment of the invention, the method may include the step of passing the dried web through a one nip calendar with a nip pressure in the range of 40 to 60 lbs/linear inch. It is preferred that the dried web be passed through a light one nip calendar with a nip pressure of 50 lbs/linear inch to provide web smoothness and caliper uniformity. The finished dried web product should have a caliper of less than 0.006 inch.

According to another preferred embodiment of the invention, the step of compressing the web in the compression nip may be replaced by the steps of forming a non-compression nip between the roll and a fluid-pervious material having an undulating, patterned surface, the step of moving the material at a speed between about 5% and about 25% less than the surface speed of the roll and the step of applying a vacumm through the material at the non-compression nip to directly transfer the web from the roll to the material and to generally conform the surface of the web in contact with the moving material to the patterned surface of the material while the surface of the web opposite the moving material remains substantially smooth.

As embodied herein, and as shown in FIG. 9, the fabric material may be of many known types which are fluid-pervious and have an undulating, patterned surface. One example may be seen in FIG. 10. A vacuum roll 290 applies a vacuum to web 24 through slit 292 in the vacumm roll and through voids in undulating fabric material 256. The vacuum helps transfer the web to the fabric surface while also forming the web to the undulating, paterned surface of the fabric material. The smoothness of the side of the web in contact with the fabric material is determined in part by the magnitude of the vacuum applied at non-compression nip 294. Preferably, the vacuum will be in the range of about 1 to about 20 inches of mercury. A vacuum of 1 inch of mercury is sufficient to effect the transfer of the web, and will result in a web surface facing the fabric material that is relatively smooth.

The Product

The method and apparatus of the invention produces a fibrous web material having unique physical characteristics that are advantageous for use as a base material for a masking tape. Specifically, the product comprises a sheet of fibrous material comprising contacting fibers bonded together, a sheet having opposite smooth surfaces, an apparent bulk in the range of about 0.10 to about 0.20 caliper pts/lb ream of 3000 sq. ft. in area and a machine direction stretch of at least 8%, wherein surface undulations on opposite smooth surfaces of the sheet have an amplitude variance of less than 0.0002 inch. It is further preferred that the fibrous sheet have a machine direction tensile strength of at least 12 lbs/inch and that the caliper of the sheet be less than 0.006 inch. The product of the present invention has the advantage that it is stretchable and that it has improved smoothness on its opposite surfaces. The fibrous web product is also strong and thin enough for use in a masking tape. The product of this embodiment has a smooth first surface to which adhesive can be afixed and an opposite smooth second surface to which a nonstick coating can be applied to produce a tape with better masking and sealing capabilities than conventional tapes.

The product produced by the method and apparatus described with reference to the alternative embodiment shown in FIG. 9 can also be beneficially applied as a fibrous tape base material. The product of this embodiment is a web material comprising contacting fibers bonded together, the web has a first surface with patterned undulations and an opposite second relatively smooth surface, the web having an apparent bulk in the range of about 0.10 to about 0.20 caliper pts/lb ream, a machine direction tensile strength of at least 12 lbs/inch and a machine direction stretch of at least 8%. It is preferred that the first surface be patterned with undulations of an amplitude variance between about 0.0003 inch and about 0.0004 inch and that the second opposite relatively smooth surface have undulations with an amplitude variance of less than 0.0003 inch.

The undulations were measured by tracing a one-inch length of sample in the machine direction using a Bendix Profilometer with a stylus tip radius of 0.0005" in conformance with American Standard ASA, B46.1-1962. The profilometer was connected to a computer system which made 2100 observations for each profile from which the variance of the amplitude from its means was computed in each case. The variance reflects surface roughness, i.e. the lower its value, the smoother the surface.

In Table I, fibrous tape base product samples produced according to the various embodiments of the invention are compared with fibrous tape base samples of conventional creped tape bases. Sample A is an example of a product produced with the apparatus and method described with regard to FIGS. 2-5. Samples B-F were produced by the apparatus and method discussed with regard to FIG. 9. Samples G and H are examples of conventional creped tape base webs. The unique balance of characteristics in the product of the present invention can be seen when this product is compared with the conventional tape base samples F and G in Table I.

TABLE I

|  | CHARACTERISTIC | | | | | | | |
|---|---|---|---|---|---|---|---|---|
|  | A (2685-3C) | B (2548-4C) | C (2535-8) | D (2536-3) | E (2536-5) | F (2548-4) | G (2400-3) | H (2539-2) |
| P Hg" Vacuum | NA | 1.1 | 18 | 4.5 | 1.5 | 1.1 | NA | NA |
| % s Speed Differential | 14 | 16 | 17 | 17 | 17 | 16 | NA | 20 (crepes) |
| Basis Weight, lb/3000 ft² | 29.4 | 28.5 | 28.7 | 28.5 | 28.3 | 29.2 | 26.1 | 27.1 |
| Caliper, .001" | 3.9 | 3.8 | 5.4 | 5.1 | 4.9 | 5.4 | 6.6 | 6.6 |
| Apparent Bulk, caliper pts lb ream | .133 | .133 | .188 | .179 | .173 | .185 | .252 | .243 |
| MD Tensile, lb/in | 15.7 | 13.3 | 18.5 | 17.9 | 18.1 | 12.8 | 10.8 | 12.9 |
| CD Tensile, lb/in | 6.5 | 7.5 | 8.3 | 7.2 | 7.7 | 8.1 | 6.9 | 7.9 |
| MD Stretch, % | 8.0 | 9.3 | 10.5 | 12.7 | 12.1 | 11.3 | 13.9 | 16.5 |
| Undulations Fabric Side, mil. | .148 | .179 | .374 | .339 | .331 | .365 | .571 | .502 |
| Undulations Opposite Side, mil. | .100 | .114 | .272 | .265 | .221 | .201 | .517 | .416 |

What is claimed is:

1. A method of manufacturing a stretchable fibrous tape base material having surfaces with improved surface smoothness, comprising the steps of:
   (a) forming a wet fibrous web;
   (b) partially dewatering the web to between about 30% and about 50% solids;
   (c) conveying the partially dewatered web on a smooth-surfaced roll to a compression nip defined by the smooth-surfaced roll and a smooth-surfaced fabric material;

(d) moving said fabric material at a speed of about 10% to about 20% less than the surface speed of said smooth-surfaced roll;

(e) compressing said web in said nip by forcing said fabric material against said web on said smooth-surfaced roll to directly transfer said web from said roll to said material, said fabric material being compressed against said web with a compression force of less than 15 lbs/linear inch and the average pressure is less than 50 psi in the compression nip, said web being further compressed in the machine direction by the difference in speed between said fabric material and the surface of said roll; and (f) drying said web, said dried web having an apparent bulk less than 0.20 caliper pts/lb ream.

2. The method of claim 1 wherein said dried web has a caliper of less than 0.006 inch.

3. The method of claim 2 including the step of passing the dried web through a one nip calendar with a nip pressure in the range of 40 to 60 lbs/linear inch.

4. The method of claim 2 wherein the fabric material has a first surface facing the smooth-surfaced roll, said first surface being shaved to reduce roughness.

5. The method of claim 4 wherein said fabric material is comprised of woven polyester threads having a diameter less than 0.007 inch.

6. The method of claim 5 wherein the polyester threads are woven in a configuration in which each of said threads is spaced within 0.006 inch of a generally parallel thread.

7. The method of claim 5 wherein said fabric is a 5-shed (1×4) broken twill weave with an 84×84 per square inch mesh.

8. The method of claim 4 wherein the dried web includes first and second surfaces having undulations of an amplitude less than 0.00015 inch.

9. The method of claim 1 wherein only selected areas of the fabric material are forced against said web with said compression force.

10. The method of claim 1 wherein said fabric material is pressed against said web with a compression force of less than 5 lbs/linear inch and the average pressure is less than 20 psi in the compression nip.

11. The method of claim 1 wherein the fabric material is subjected to a tension on opposite sides of the compression nip, the tension on the fabric material entering said nip being greater than the tension on the fabric material exiting said nip.

12. The method of claim 1 wherein the fibrous web is comprised of wood fibers.

13. The method of claim 1 wherein the web is comprised of between about 30% and about 50% solids when said web enters the compression nip.

14. An apparatus for manufacturing a stretchable fibrous base web having opposite surfaces with improved smoothness and reduced apparent bulk, comprising:

means for forming a wet fibrous web;

dewatering means for partially dewatering said web to between about 30% and about 50% solids;

a smooth-surfaced roll having an outer circumferential surface for conveying the dewatered web at a predetermined speed to a transfer station;

first and second support rollers, each having an outer circumferential surface, positioned on opposite machine direction sides of said transfer station, said support rollers being disposed along a linear path corresponding to a line passing through the transfer station, said line being tangent to the outer circumferential surfaces of the first and second support rollers and the outer circumferential surface of the smooth-surfaced roll;

a sheet of fabric material for receiving the web at said web transfer station and for conveying the web from the transfer station at a speed less than said predetermined speed, said sheet of fabric material being supported along said linear path between said first and second support rollers substantially coincident with said line;

compression means for applying a compression force at the transfer station of less than 15 lbs/linear inch on said web through said sheet of fabric material for transferring said web from said smooth-surfaced roll to said sheet of fabric material, and for compressing said web to adjust the apparent bulk of said web; and means for drying said web after compression, said dried web having an apparent bulk of less than 0.20 caliper pts/lb ream.

15. The apparatus of claim 14 further comprising a one nip calendar for receiving said web from said drying means, said one nip calendar having a nip pressure in the range of 40 to 60 lbs/linear inch.

16. The apparatus of claim 14 wherein said dewatering means comprises felt-loop means for receiving said wet web from said forming means and the generally smooth-surfaced roll defines a first compression nip with said felt loop means.

17. The apparatus of claim 16 wherein said smooth-surfaced roll defines a second compression nip with said sheet of fabric material at said web transfer station.

18. The apparatus of claim 17 wherein said sheet of fabric material has a first smooth and porous surface facing said smooth-surfaced roll at said second compression nip.

19. The apparatus of claim 18 wherein said sheet of fabric material is comprised of woven polyester threads having a diameter less than 0.007 inch.

20. The apparatus of claim 19 wherein said polyester threads are woven in a configuration in which each of said threads are spaced within 0.006 inch of a generally parallel thread.

21. The apparatus of claim 16 wherein said fabric is a 5-shed (1×4) broken twill weave with an 84×84 per square inch mesh.

22. The apparatus of claim 18 including means for subjecting said fabric material to a machine direction tension, said tension being greater in the fabric material entering said second compression nip than in the fabric material leaving said second compression nip.

23. The apparatus of claim 18 wherein said compression means comprises a back-up roller covered with a soft elastic material, said back-up roller abutting a second surface of said sheet of fabric material opposite from said first surface at the second compression nip.

24. The apparatus of claim 23 further comprising back-up roller adjusting means for moving the back-up roller toward and away from said smooth-surfaced roll to adjust the compression of said fabric material against said web and smooth-surfaced roll, said first surface of said sheet of fabric material being tangential to the surface of the smooth-surfaced roll at the second compression nip when said back-up roller is adjusted away from said smooth-surfaced roll.

25. The apparatus of claim 24 wherein said back-up roller has an outer circumferential surface patterned with raised cross hatching, the area of said raised cross hatched portions of said back-up roller outer circumferential surface including about 35% of the outer circumferential surface of said roller.

26. The apparatus of claim 25 including means for adjusting the compression of said fabric material against said web and smooth-surfaced roll to a positive value less than 5 lbs/linear inch.

* * * * *